United States Patent

[11] 3,596,963

| [72] | Inventor | Francis Lee Phillips |
| | | 6909 Sunnydale Way, Valley Station, Ky. 40272 |
| [21] | Appl. No. | 843,718 |
| [22] | Filed | July 22, 1969 |
| [45] | Patented | Aug. 3, 1971 |

[54] BREAKABLE BUMPER EXTENSION
6 Claims, 6 Drawing Figs.

[52] U.S. Cl. ................................................ 293/76, 293/99
[51] Int. Cl. ...................................................... B60r 19/04
[50] Field of Search .......................................... 293/50 P, 52 F, 74, 75, 76, 77, 98

[56] References Cited
UNITED STATES PATENTS

| 1,651,005 | 11/1927 | Veale | 293/74 |
| 1,705,119 | 3/1929 | Jacobs | 293/74 |
| 2,954,256 | 9/1960 | Barenyi | 293/70 |

Primary Examiner—Drayton E. Hoffman
Assistant Examiner—Robert Saifer
Attorney—William R. Price ABSTRACT: A breakable elongated bumper extension fabricated of a glass-fiber-reinforced polymer to be mounted on the end of the middle portion of a truck bumper. Upon impact with a guard rail or other object, the extension will break off rather than bend. This prevents a bent bumper from locking the front wheel of the truck. The middle section of the bumper, attached to the projecting frame members of the truck, provides protection against head-on impact. The extension prevents rocks and other objects from being thrown forwardly by the truck's front wheel into the windshield of oncoming automobiles.

PATENTED AUG 3 1971  3,596,963
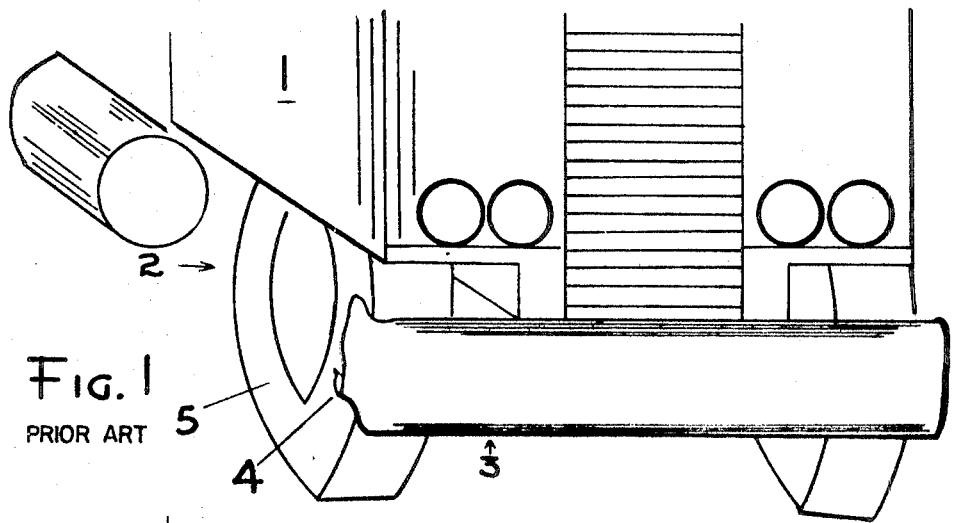
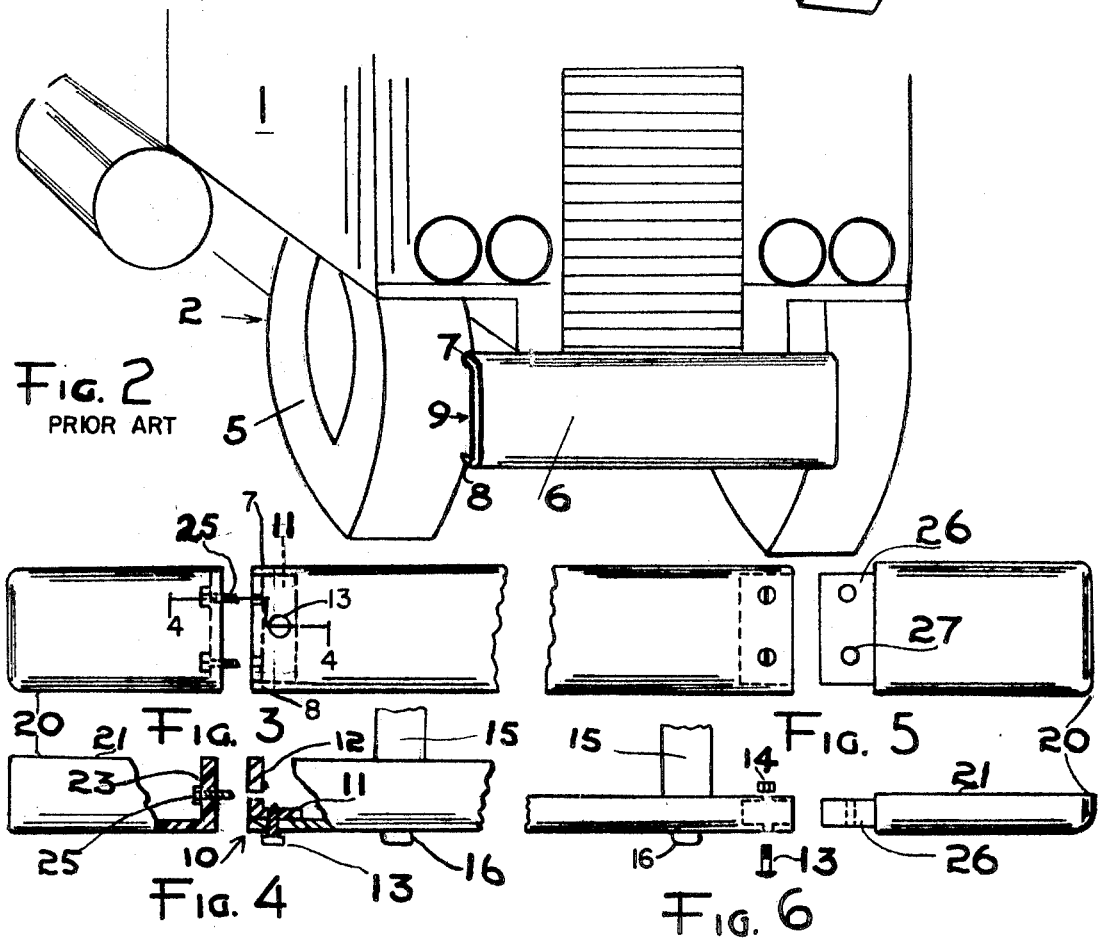
INVENTOR.
FRANCIS LEE PHILLIPS
BY Wm. R. Price
ATTORNEY

BREAKABLE BUMPER EXTENSION

BACKGROUND OF THE INVENTION

This invention relates to bumpers for use with trucks and specifically to bumpers utilized with tractors of the tractor-trailer type. As is well known in the art, bumpers are attached to projecting frame members of the tractor and extend across the front of the tractor to protect same from impact. A function of the portion of the bumper extending across the front wheel is to prevent objects such as rocks which are picked up by the tire of the front wheel from being propelled into oncoming automobiles. This invention relates to breakable elongated extensions fabricated of a glass-fiber-reinforced polymer which may be mounted onto the end of the middle portion of the conventional metal truck bumper.

DESCRIPTION OF THE PRIOR ART

As mentioned, the function of the bumper of a tractor is to protect the tractor from impact with another object. The extension extending from the point of attachment, (to the tractor frame), to the outside of the front wheel, prevents objects from being picked up and thrown forwardly by the tire of the front wheel. However, in some instances, a driver will strike a guardrail or will sideswipe a deer or some form of livestock, thus bending the end of the metal bumper to such an extent that the bent end cuts into the sidewall of the tire of the front wheel. In such instances, the tire blows out, or the wheels become locked, throwing the truck out of control. Some drivers have adopted the practice of cutting off about 18 inches of truck bumper at each end so as to prevent the metal bumper end from becoming involved with the front wheel of the tractor. However, this does not provide any protection to the oncoming motorist from objects being picked up and thrown forwardly by the truck tire. Many proposals have been made in the automotive field, relative to energy-absorbing bumper assemblies and to the use of shear pins, whereby bumpers or portions thereof are sheared off upon impact. However, as far as I am aware, an extension fabricated of a glass-fiber-reinforced polymer, specifically designed to break upon impact and thus avoid cutting into the front tire or locking the front wheel of a tractor is new. Thus, for example, the patent to Kroell, 3,146,014 relates to a tubular support for a bumper which, upon impact, folds back on itself to absorb the energy of the impact. The patents to Bohn 2,845,144 and 2,896,735 relate to a shear plate attached to the frame assembly which, under impact will shear loose and deflect the force of the impact along the frame. The patents to Dropkin and Dison 2,837,176 and 3,081,119, respectively, relate to specific arrangements for shear pins so that the bumper assemblies will shear off under specific impact. It is thus clear that the concept of utilizing shearpins and shear plates to shear off a bumper or portion thereof upon impact is broadly old.

SUMMARY OF THE INVENTION

According to my invention, however, there is provided an elongated extension fabricated of a glass-fiber-reinforced polymer, mounted to the end of the middle portion of a conventional metal bumper which extends across the front wheel so as to protect oncoming motorists from objects propelled forwardly by the front wheel and which is fabricated of a material which is nonbendable and which will break upon impact so as not to lock the front wheel or to cut into the tire.

BRIEF DESCRIPTION OF THE DRAWINGS

FIG. 1 is view in perspective, illustrating the relationship of a standard prior art bumper to the front wheel of a truck and illustrating the damage which can be done by a bent bumper.

FIG. 2 is a view in perspective, illustrating a sawed-off front bumper and its relation to the front wheel of a truck.

FIG. 3 is a front elevation of a fragment of a sawed-off bumper and the elongated fiber-glass-reinforced polymer extension of this invention.

FIG. 4 is an enlarged plan view of the bumper and fiber-glass-reinforced polymer extension with portions in section along lines 4—4 of FIG. 3 to illustrate the method of mounting the extension to the bumper.

FIG. 5 is front elevation of a fragment of the sawed-off bumper and a modification of the elongated fiber-glass-reinforced polymer extension of this invention.

FIG. 6 is plan view of a fragment of the bumper and a modification of the fiber-glass-reinforced polymer extension, illustrating the method of mounting the modified extension to the bumper section.

DESCRIPTION OF THE PREFERRED EMBODIMENT

Referring now to the drawings in detail, the tractor of the tractor-trailer type of motor vehicle is designated by numeral 1. The front wheel 2, is protected by the bumper 3, extending all the way across the front of the tractor 1. The end of the bumper, as shown, has a bent portion 4, extending back into the sidewall 5 of the tire of the front wheel 2. Thus, impact of the bumper with a guardrail in a sideswiping motion bends the metal bumper backwardly as illustrated. This may cut into the sidewall 5 of the tire of the front wheel 2 and cause a blowout or throw the truck or tractor out of control. Accordingly, some drivers have sawed off the ends involving the lateral 18 or so inches of the bumper 3, leaving a middle portion 6 which, as shown, terminates at the top with an inwardly turned lip 7 and at the bottom with a lower inwardly turned lip 8, forming a channel portion 9. This forms the main part of the body 6 of the bumper 3. However, with this type of arrangement, oncoming motorists are not protected from rocks and other objects propelled forwardly by the tire 5 of the front wheel 2. As is illustrated in FIGS. 4 and 6, the middle or body portion 6 of the bumper 3 is mounted onto the projecting frame members 15 of the tractor by means of bolts 16 in a conventional manner.

According to my invention, the elongated rigid breakable extensions 20 are fabricated of a glass-fiber-reinforced polymer. This material has sufficient strength to deflect rocks and other objects propelled forwardly by the tires of the front wheel 2 of the tractors, but will break under sharp impact with a stationary or comparatively solid object, such as a guardrail, a standard or some type of livestock. I prefer a molded fiberglass-reinforced, polymeric material which is relatively stiff so as not to bend under impact but so as to actually break and fall away from the truck so as to prevent damage to tires and to the front wheel steering mechanism.

As is illustrated, the extension 20 has an upper, inwardly turned lip 21 and in the modification illustrated in FIGS. 3 and 4, an inwardly turned vertical flange 23 adapted to mate in abutment with a flange formed by leg 12 of the vertically disposed angle iron 10 bolted by means of bolts 13 to the end of the body 6 of the bumper. Thus, as is illustrated, leg II of angle iron 10, lying in rubbing and coplanar relationship with the interior surface of the channel 9, is bolted to the bumper by means of bolt 13. The vertical flange thus formed by leg 12 abuts against the molded vertical flange 23 of the extension 20 so as to be bolted by means of bolt 25 into engagement with the body portion 6 of the bumper. It should be noted that this invention does not rely on shearpins or shear plates but that the extension 20 itself is breakable so that the portion striking the guardrail or traffic standard post is broken off and falls away from the front wheel 2 of the tractor.

Another method of mounting the extension 20 into the end of the middle body 6 of the bumper 3 is by means of a tongue 26 slidably positioned into channel 9 formed by the upper and lower inwardly turned lips 7 and 8, respectively, of the bumper and which is held in position by means of bolt 13 running through holes 27 of the tongue and held in engagement by nut 14. Again, the bolts 13 are not adapted to act as shearpins but as a method of bolting the extension onto the bumper so that the extension itself will break under sufficient impact without coming into contact with the front wheels of the tractor.

I claim:

1. A bumper assembly for a truck or tractor of the tractor-trailer type, having a pair of transversely spaced front wheels comprising:
   A. a horizontally elongated metal body portion, having inwardly turned upper and lower lips, said body portion extending across and being mounted to the projecting frame members of said tractor, but terminating short of the inside of said front wheels;
   B. a rigid breakable elongated extension, fabricated of a glass-fiber-reinforced polymer and mounted to said body portion at each end, said elongated extension extending from a point inside of said front wheel to a point on the outside of said front wheel; and
   C. means to attach said elongated extension to the end of said body portion.

2. A bumper assembly, as defined in claim 1, in which:
   a. said elongated extension includes a projecting tongue on its medial end, said tongue being slidably fitted between the upper and lower lips of said body portion; and,
   b. said attaching means comprises fastening means to fasten said tongue and said body portion into rigid engagement.

3. A bumper assembly, as defined in claim 1, in which:
   a. said elongated extension has an inwardly turned vertical flange on its medial end, and,
   b. said attaching means comprises:
      1. an angle iron vertically fitted between said upper and lower lips of said body portion with one leg of said angle iron lying parallel and in alignment with said body portion and the other leg forming an inwardly turned vertical flange, adapted to fit in abutment with the flange of said medial end of said extension;
      2. bolts for bolting said flanges together in rigid engagement.

4. For use with a sawed-off bumper of a truck or tractor of the tractor-trailer type having a pair of transversely spaced front wheels,
   A. a rigid, breakable, elongated extension, fabricated of a glass-fiber-reinforced polymer, said extension being mounted to the end of said sawed-off bumper at a point inside of said front wheel, and extending across said front wheel to a point outside of said front wheel.

5. An elongated extension, as defined in claim 4, which includes:
   a. a projecting tongue on the medial end of said elongated extension, said projecting tongue being slidably fitted in rubbing engagement with the interior surface of said sawed-off bumper for mounting of said extension to said sawed-off bumper.

6. An elongated extension, as defined in claim 4, in which:
   a. said elongated extension has an inwardly turned vertical flange at its medial end for mounting in abutment with said sawed-off bumper.